United States Patent
Alsaggaf et al.

(10) Patent No.: US 11,311,793 B1
(45) Date of Patent: Apr. 26, 2022

(54) 3D PRINTED MAZE LOCK SYSTEM

(71) Applicant: King Abdulaziz University, Jeddah (SA)

(72) Inventors: Abdulrahman U. Alsaggaf, Jeddah (SA); Asmaa Ubaid Al-Saggaf, Jeddah (SA); Ahmed Ubaid Al-Saggaf, Jeddah (SA); Zahraa Ubaid Al-Saggaf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/506,278

(22) Filed: Oct. 20, 2021

(51) Int. Cl.
| | |
|---|---|
| *A63F 7/04* | (2006.01) |
| *B65D 43/16* | (2006.01) |
| *B65D 43/22* | (2006.01) |
| *B33Y 80/00* | (2015.01) |
| *E05C 3/16* | (2006.01) |
| *E05C 3/30* | (2006.01) |

(52) U.S. Cl.
CPC .............. *A63F 7/042* (2013.01); *A63F 7/044* (2013.01); *B33Y 80/00* (2014.12); *B65D 43/167* (2013.01); *B65D 43/22* (2013.01); *E05C 3/165* (2013.01); *E05C 3/30* (2013.01)

(58) Field of Classification Search
CPC ......... A63F 7/042; A63F 7/044; B33Y 80/00; B65D 43/22; E05C 3/165; E05C 3/30; E05B 37/20; E05B 37/00; Y10T 70/7169; Y10T 70/7203; Y10T 70/7175
See application file for complete search history.

(56) References Cited

U.S. PATENT DOCUMENTS

| | | | |
|---|---|---|---|
| 1,733,772 A * | 10/1929 | Battershell | E05B 37/20 206/1.5 |
| 4,073,169 A | 2/1978 | Nelson | |
| 4,136,542 A * | 1/1979 | Robison | E05B 37/20 206/1.5 |
| 2011/0266749 A1* | 11/2011 | Holmes | A63F 9/08 273/153 S |

FOREIGN PATENT DOCUMENTS

| | | |
|---|---|---|
| CN | 2337254 Y | 9/1999 |
| CN | 204952225 U | 1/2016 |
| DE | 80 14 721 | 10/1980 |

OTHER PUBLICATIONS

Puzzle Master Inc. ; Treasure Chest Puzzle Box ; https://www.puzzlemaster.ca/browse/allpuzzleboxes/puzzleboxes2/14697-treasure-chest-puzzle-box ; May 31, 2021 ; 12 Pages.
Puzzle Master Inc. ; Kugel Box ; https://www.puzzlemaster.ca/browse/wood/puzzlebexes/11148-kugel-box ; May 31, 2021 ; 8 Pages.

* cited by examiner

*Primary Examiner* — Shawn M Braden
(74) *Attorney, Agent, or Firm* — Oblon, McClelland, Maier & Neustadt, L.L.P.

(57) ABSTRACT

A mechanical lock box comprising a housing including a lid and a hook fastener attached to the lid and a 3D multi-level printed maze. A release chamber is located within the maze and a ball is enclosed in the maze. The mechanical lock box further includes a hook bar having a first hook bar end which pivotally connects to a pivot box in the maze and a second hook bar end having a lock hook configured to engage with the hook fastener to hold the lid in a locked position. A hook pusher is configured to pivot the hook bar to unlock the lid when the ball pushes against the hook pusher.

18 Claims, 12 Drawing Sheets

3D PRINTED MAZE LOCK SYSTEM

STATEMENT OF ACKNOWLEDGEMENT

The inventors extend their appreciation to the Deputyship for Research and Innovation, Ministry of Education in Saudi Arabia for funding this research work through the project number 2021-011 and King Abdulaziz University, DSR, Jeddah, Saudi Arabia.

BACKGROUND

Technical Field

The present disclosure is directed to locking systems, and more particularly to a mechanical lock box, a method of operating the mechanical lock box and a method of manufacturing the mechanical lock box.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the need to secure personal effects, many different types of locking arrangements have been devised throughout history. For securing small items, a lockbox may be used which refers to a container or otherwise enclosed space with a built-in lock. Such lockboxes have been typically used as cash boxes, treasure boxes, tool boxes and the like. Traditionally lock boxes employ a padlock and a physical key, that are part of a locking mechanism, which keeps a lid of the container closed and prevents its opening after personal items have been placed within the box and the padlock has been locked. However, this presents the difficulty of securing the physical key and locating the physical key each time the lockbox needs to be locked or unlocked. More recently, locking mechanisms have become available such as electronic locks, high-tech password protected locks, fingerprint locks, Bluetooth locks, far-infrared locks, gene locks, and the like, which may solve the problem of managing the physical key, but such locking mechanisms may be expensive to incorporate in the lockbox and require a power source.

Additionally, it may be desired for the lockboxes to incorporate an element of intrigue, for example, making the process of opening the lockbox a game or a puzzle to be solved. Such types of lockboxes are known in the art, and are referred by different names such as puzzle boxes, magic boxes, trick boxes, secret boxes, and the like. Such lockboxes employ locking mechanisms that may be opened by solving a puzzle, with some requiring only a simple move and others a series of discoveries. However, the incorporated puzzle in the lockbox could be seen by a second person with access to the lockbox and thus could be solved with some intelligence and manipulation by that second person. Additionally, when the lockbox is utilized for storing personal items, the owner of the lockbox may wish for the unlocking mechanism to be private, so that the lockbox cannot be physically accessed by any other person and with the solution to the lockbox known only to the owner.

U.S. Pat. No. 4,073,169A describes a locking device in which a ball within a box is moved by spatially orienting the box through a labyrinthic passageway until arriving at a position adjacent an associated locking mechanism, which then moves a latch to unlock the box. The container cannot be opened until the ball has been rolled by spatial manipulation of the container, to negotiate the labyrinth, arrive at a position adjacent the locking mechanism, and operate same solely by the impression of its weight thereupon. This reference provides that the labyrinthic passageway is formed in a bottom of the box which includes only a single-level (two-dimensional) maze, allowing for limited manipulation and therefore can only have limited complexity in the unlocking operation.

CN204952225U describes a multi-level 3D printed maze in which a ball or balls are moved by spatial orientation. The maze body in this maze includes a maze subassembly of at least upper and lower concatenations, and the outer wall of every maze subassembly includes a maze passageway, and the maze passageway has two at least entries and an exit for passage of the ball. This reference provides a toy maze in which the ball is visible as it moves through the maze and does not suggest any locking functionality.

Each of the aforementioned references suffers from one or more drawbacks hindering their adoption. Accordingly, it is an object of the present disclosure to provide a mechanical lock box, methods of operating the mechanical lock box and methods for manufacturing the mechanical lock box that are customizable, complex, and provide a unique and concealed unlocking operation.

SUMMARY

In an exemplary embodiment, a mechanical lock box is described. The mechanical lock box comprises a housing including a lid. The mechanical lock box further comprises a hook fastener attached to the lid. The mechanical lock box further comprises a three-dimensional (3D) multi-level printed maze located within the housing. The three-dimensional (3D) multi-level printed maze includes a plurality of maze pathways. The mechanical lock box further comprises a release chamber located within an upper level of the 3D multi-level printed maze. The mechanical lock box further comprises a ball enclosed in the 3D multi-level printed maze. The ball is free to roll along the maze pathways and into the release chamber. The mechanical lock box further comprises a hook bar having a first hook bar end which extends through a slot in the upper level and pivotally connects to a pivot box in the 3D multi-level printed maze and a second hook bar end having a lock hook configured to engage with the hook fastener to hold the lid in a locked position. The mechanical lock box further comprises a hook pusher connected beneath the hook bar and located within the release chamber. The hook pusher is configured to pivot the hook bar to unlock the lid when the ball pushes against the hook pusher.

In another exemplary embodiment, a method of operating a mechanical lock box including a three-dimensional (3D) multi-level printed maze is described. The method includes pressing a first rod end of a push rod. The method further includes manipulating the mechanical lock box in three dimensions until a ball within a release chamber of the 3D multi-level printed maze aligns with a second rod end of the push rod. The method further includes compressing the push rod against the ball until the ball forces a hook bar to pivot and release a lock hook of the hook bar from a hook fastener connected to a lid of the mechanical lock box.

In another exemplary embodiment, a method of manufacturing a mechanical lock box is described. The method includes forming a housing including a hinged lid from a material selected from the group comprising wood, nylon, polyvinyl chloride, polythene, polytetrafluoroethelene, steel, carbon steel, silver, gold, titanium, tungsten, iridium, osmium, chromium, brass and combinations of the same. The method further includes printing, with a 3D printer, a three-dimensional multi-level printed maze from a material selected from the group comprising polyether ether ketone (PEEK), polylactic acid (PLA), acrylonitrile butadiene styrene (ABS), polyethylene terephthalate glycol (PETG), resin and combinations of the same. The method further includes placing a ball in the three-dimensional multi-level printed maze so that the ball rolls freely along a plurality of tortuous maze pathways of the three-dimensional multi-level printed maze. The method further includes inserting a push rod through a circular cutout in a wall of the housing into the three-dimensional multi-level printed maze. The method further includes printing, with the 3D printer, a hook bar having a first hook bar end with an axle hole and a second hook bar end having a lock hook. The method further includes inserting the hook bar into a slot in the three-dimensional multi-level printed maze. The method further includes connecting the first hook bar end of the hook bar to a pivot box. The method further includes attaching a hook fastener to the hinged lid.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
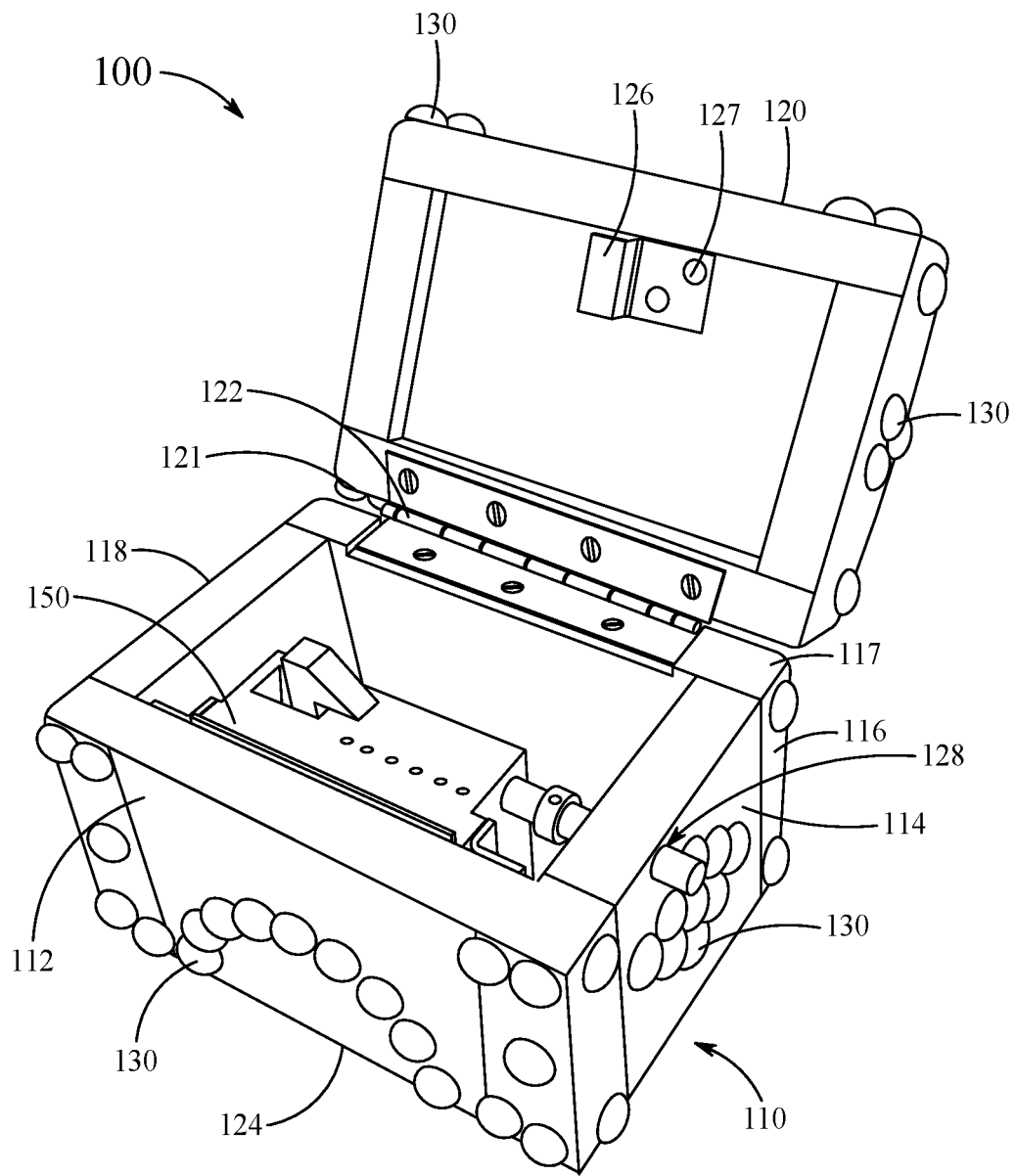
FIG. 1 is a perspective view of a mechanical lock box, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a mechanical lock box, methods of operating the mechanical lock box and methods for manufacturing the mechanical lock box. The present mechanical lock box is based on a three-dimensional multi-level printed maze installed inside a housing. The maze is computer-generated with an algorithm ensuring a random design with a solvable puzzle. Each such maze may have a different design and as the maze is hidden inside the cubic box, therefore, a user may need to remember a particular design of the maze for a given mechanical lock box in order to open the mechanical lock box, thus personalizing the mechanical lock box personal to its specific user.

Referring to FIG. 1, a perspective view of an exemplary mechanical lock box 100 is illustrated. The present mechanical lock box 100 is a puzzle box (also referred to as a secret box or trick box) which is in the form of a container that can be opened by solving a puzzle. Particularly, the present mechanical lock box 100 is a three-dimensional box that is opened mechanically through a series of spatial manipulations. In the present examples, the mechanical lock box 100 must be manipulated by spatially moving and orienting the mechanical lock box 100 in three dimensional space in a generally predefined pattern in order to unlock the box, as will be discussed later in the description in more detail.

The mechanical lock box 100 includes a housing 110. The housing 110 includes a first wall 112, a second wall 114, a third wall 116 and a fourth wall 118. In the housing 110, the first wall 112 and the third wall 116 are perpendicular to the second wall 114 and the fourth wall 118. Further, the first wall 112, the second wall 114, the third wall 116 and the fourth wall 118 are connected so as to form housing sides. Herein, the first wall 112, the second wall 114, the third wall 116 and the fourth wall 118 are being collectively referred to as the "housing sides" for the housing 110.

The housing 110 also includes a lid 120. The lid 120 may generally act as a cover for the housing 110, and thus may be used to provide access to the interior space of the housing 110 when in an open configuration thereof (as depicted in FIG. 1) and restrict access to the interior space of the housing 110 in a closed configuration thereof (not depicted).

The lid 120 may rest on and be supported by the housing sides when in the closed configuration thereof. In the present configuration, the lid 120 may generally have same area as a cross-sectional area of the housing sides formed by connecting the first wall 112, the second wall 114, the third wall 116 and the fourth wall 118.

The housing 110 further includes a hinge 122. As shown, the hinge 122 is connected to an edge 121 of the lid 120 and to an upper end 117 of the third wall 116. Herein, the edge 121 may refer to an edge at an intersection of a rear face of the lid 120 and a lower face of the lid 120, and the upper end 117 of the third wall 116 may refer to an edge at an intersection of a rear face of the third wall 116 and an upper face of the third wall 116 onto which the lower face of the lid 120 may be supported when the lid 120 is in the closed configuration thereof. Thereby, the lid 120 is pivotally connected with respect to the third wall 116 of the housing sides in the housing 110, and thus may be disposed between the open configuration and the closed configuration thereof.

The housing 110 further includes a floor (generally referred by reference numeral 124 in FIG. 1). The floor 124 is disposed perpendicular to the housing sides and opposite to the lid 120 of the housing 110. As may be understood, the housing sides (including the first wall 112, the second wall 114, the third wall 116 and the fourth wall 118) and the floor 124 form five sides of a rectangular box, and the lid 120 may form a sixth side to complete the housing 110. In the housing 110, the floor 124 and the lid 120 may generally be disposed parallel to each other when the lid 120 is in the closed configuration thereof. Such configuration of the housing 110 may be understood with reference to FIG. 1 and thus not described in any further detail herein.

Further, as illustrated, the mechanical lock box 100 includes a hook fastener 126. The hook fastener 126 is attached to the lid 120. In particular, as shown, the hook fastener 126 may be attached to a bottom face of the lid 120. Herein, the hook fastener 126 may generally have a C-shaped or a Z-shaped cross-section extending downwardly from the bottom face of the lid 120. As shown, the hook fastener 126 may be attached to the lid 120 using fasteners 127, such as screws and the like. The mechanical lock box 100 further includes a circular cutout (generally referred by reference numeral 128 in FIG. 1) on the second wall 114. Specifically, the circular cutout 128 may be in the form of a hole defined in the second wall 114, to allow for passage of some component (as shown) to the interior space of the housing 110.

In an aspect of the present disclosure, the housing 110 is made from a material selected from the group including wood, nylon, polyvinyl chloride, polythene, polytetrafluoroethelene, steel, carbon steel, silver, gold, titanium, tungsten, iridium, osmium, chromium, brass and combinations of the same. With the mechanical lock box 100 of the present disclosure being designed to be implemented for storing personal items and/or as a gift box, the use of such materials for the housing 110 may add to overall appeal of the present mechanical lock box 100. Further, in some examples, the housing 110 may be provided with decorations, like embellishments 130 as shown in FIG. 1, on outer faces of the housing sides and/or on a top face of the lid 120. The embellishments 130 may be arranged in some known design to form an attractive pattern. Thereby, such embellishments 130 may again add to overall appeal of the present mechanical lock box 100.

The housing 110 is designed to accommodate components of the mechanical lock box 100 as required for its operation. As shown, the housing 110 includes a locking arrangement 150 accommodated inside thereof. In some examples, the housing 110 may be a pre-made box in which the locking arrangement 150 is installed to form the present mechanical lock box 100. The locking arrangement 150 may occupy a portion of the interior space (volume) provided by the housing 110. The housing 110 may further be required to provide space for storing one or more items, such as personal items of a user (e.g., owner) of the mechanical lock box 100. Therefore, the housing 110 may be designed to have suitable dimensions sufficient to accommodate the locking arrangement 150 while providing space for the one or more items to be stored therein by the user.

It may be appreciated that although, in the present examples, the mechanical lock box 100 has been described in terms of the housing 110 which may be in the shape of a cuboid (i.e., rectangular cross-sectional shape); in other examples, the housing 110 may have some other suitable shape such as a hexagonal cross-sectional shape, octagonal cross-sectional shape or even circular cross-sectional shape without any limitations, and without departing from the spirit and the scope of the present disclosure.

Figure 2:
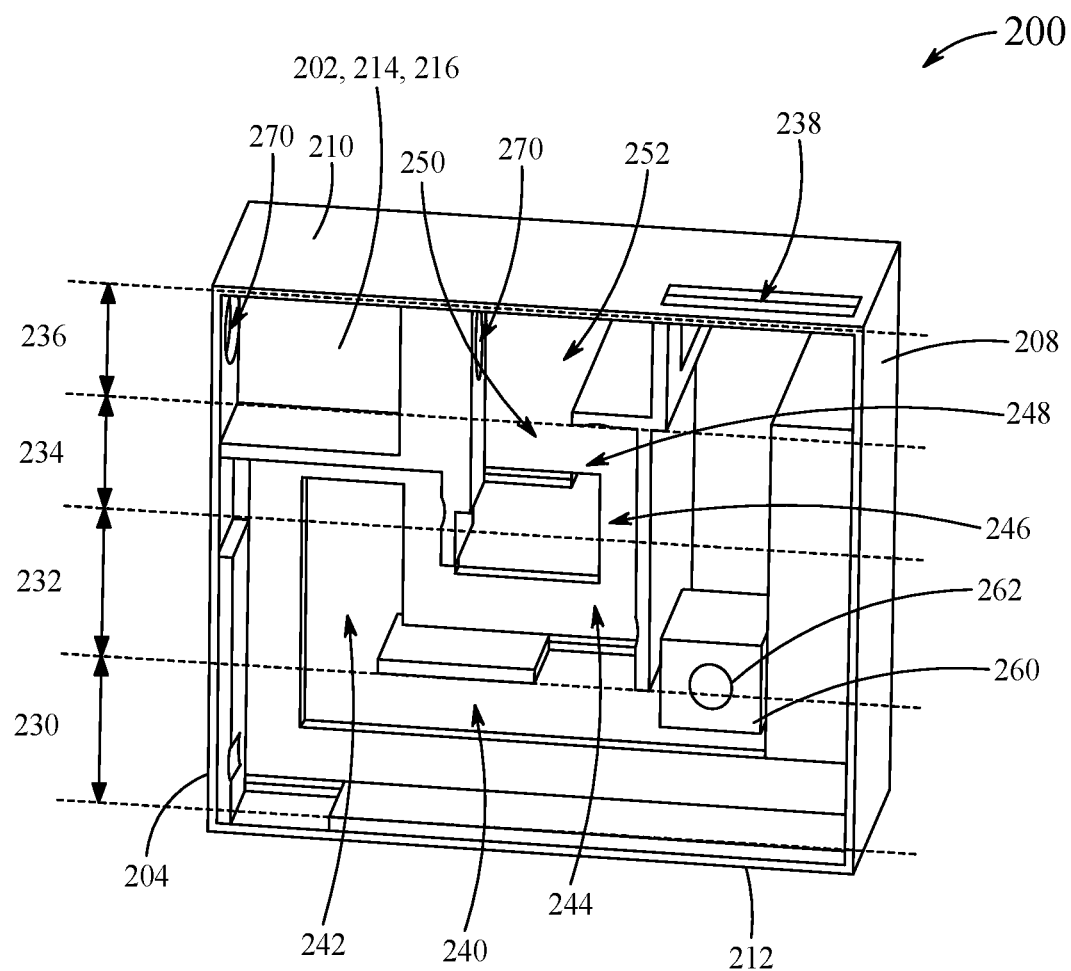
FIG. 2 is a perspective view of a three-dimensional multi-level printed maze for the mechanical lock box, according to certain embodiments.

Referring to FIG. 2, a three-dimensional (3D) multi-level printed maze 200 is illustrated. The 3D multi-level printed maze 200 is adapted to be incorporated in (be part of) the locking arrangement 150 of the mechanical lock box 100, as shown in reference to FIGS. 3A-3B. Hereinafter, FIGS. 2, 3A and 3B have been referred to in combination for the purposes of description. Herein, the "3D multi-level printed maze" has sometimes been referred to as "maze", with the two terms being interchangeably used without any limitations. Further, the use of term "three-dimensional multi-level printed" denotes an object (in this case, the maze 200) with multiple tiers or stages stacked one above the other and which is built, layer-by-layer, by a three-dimensional printing process. Such three-dimensional printing process, also known as additive manufacturing process, may be contemplated by a person skilled in the art and is beyond the scope of the present disclosure and thus not described herein. In an aspect of the present disclosure, the maze 200 is printed from a material selected from the group including polyether ether ketone (PEEK), polylactic acid (PLA), acrylonitrile butadiene styrene (ABS), polyethylene terephthalate glycol (PETG), resin and combinations of the same. Such group of materials may be selected as these could be easily implemented in the 3D printing process. It may be appreciated that although the maze 200 has been described to be manufactured using the 3D printing process; in other examples, the maze 200 may be formed from other suitable processes known in the art such as casting, sheet-metal pressing and the like without departing from the spirit and the scope of the present disclosure.

The maze 200 includes a first maze side 202 (shown in FIGS. 2 and 3A), a second maze side 204, a third maze side 206 (shown in FIG. 3B) and a fourth maze side 208. In particular, in FIGS. 2 and 3A, the third maze side 206 is removed (not shown); and similarly in FIG. 3B, the first maze side 202 is removed (not shown), to depict internal structure and components of the locking arrangement 150 in relation to the maze 200. The maze 200 further includes an upper maze side 210 and a lower maze side 212. As discussed, with the locking arrangement 150 being accommodated inside the housing 110, the maze 200 may also be construed to be located within the housing 110. In particular, the first maze side 202 is located within the housing 110 such that the first maze side 202 is adjacent to the first wall 112. Specifically, the maze 200 may be oriented with respect to the housing 110, when the locking arrangement 150 is installed in the housing 110, in a manner such that the first maze side 202 of the maze 200 is disposed parallel to the first wall 112 of the housing 110. Similarly, the second maze side 204, the third maze side 206 and the fourth maze side 208 may be adjacent (parallel) to the second wall 114, the third wall 116 and the fourth wall 118 of the housing 110, respectively. Further, the upper maze side 210 of maze 200 may be adjacent (parallel) to the lid 120 of the housing 110, and the lower maze side 212 of maze 200 may be adjacent (parallel) to the floor 124 of the housing 110.

Figure 3A:
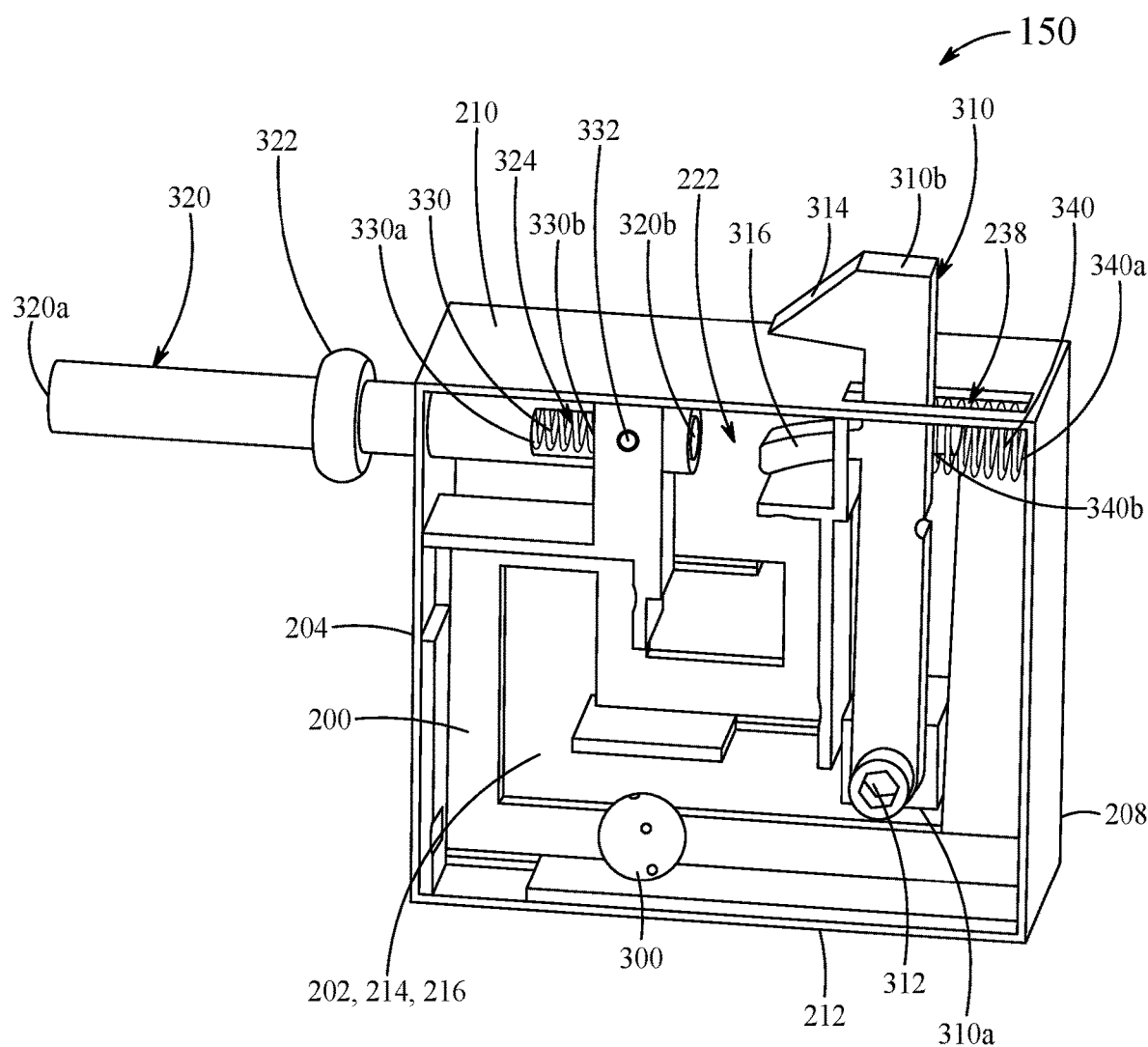
FIG. 3A is a rear perspective cross-sectional view of a locking arrangement for the mechanical lock box including the three-dimensional multi-level printed maze with a third maze side removed therefrom, according to certain embodiments.
Figure 3B:
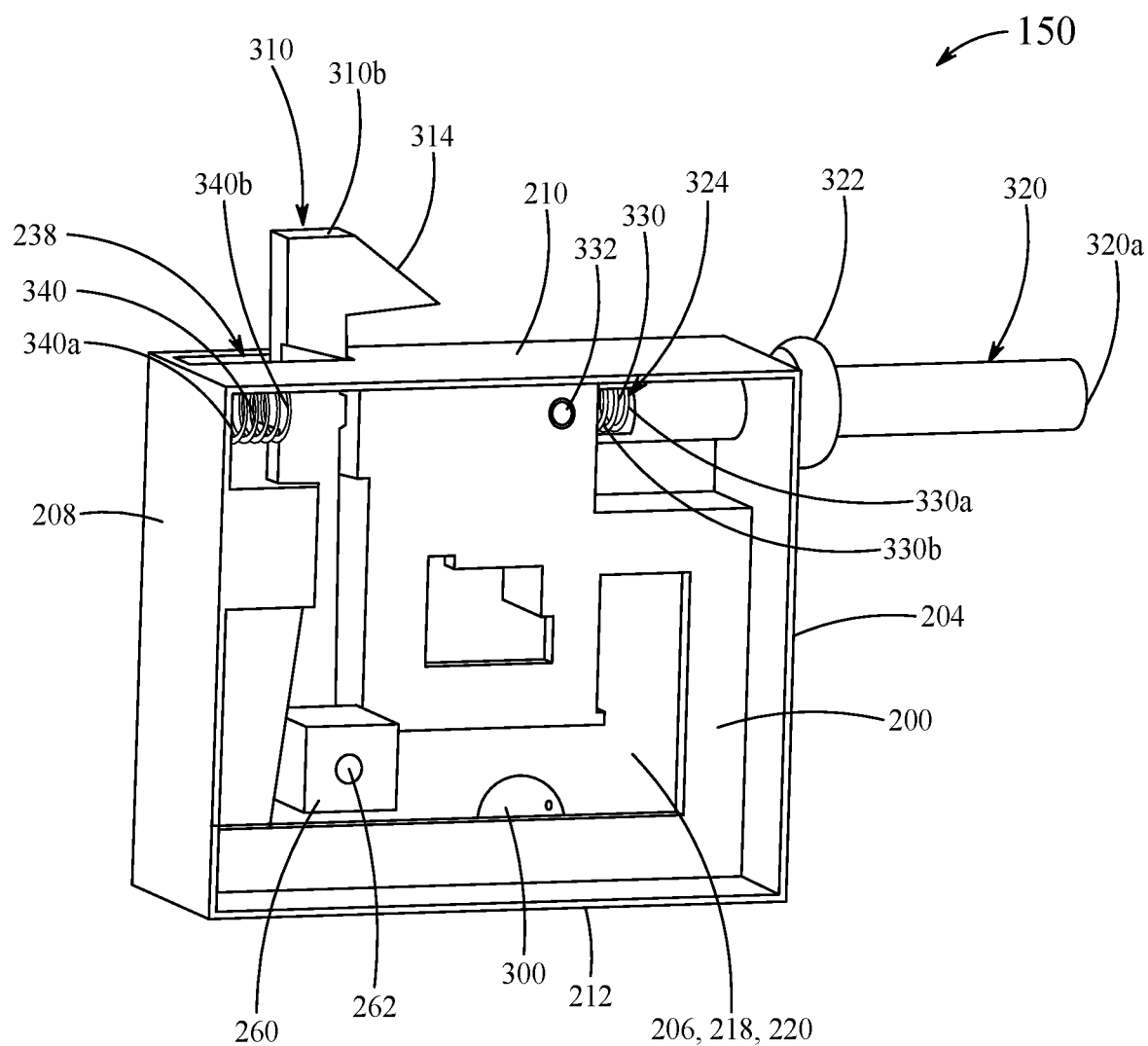
FIG. 3B is a front perspective cross-sectional view of the locking arrangement for the mechanical lock box including the three-dimensional multi-level printed maze with a first maze side removed therefrom, according to certain embodiments.

The maze 200 further includes a first metal plate 214. The first metal plate 214 is attached to an interior surface 216 of the first maze side 202. In the illustration of FIGS. 2 and 3A, the first maze side 202, the interior surface 216 of the first maze side 202 and the first metal plate 214 attached to the interior surface 216 of the first maze side 202 have been commonly labelled; although it may be understood that the interior surface 216 of the first maze side 202 may be located underneath the first metal plate 214. The maze 200 also includes a second metal plate 218. The second metal plate 218 is attached to an interior surface 220 of the third maze side 206. In the illustration of FIG. 3B, the third maze side 206, the interior surface 220 of the third maze side 206 and the second metal plate 218 attached to the interior surface 220 of the third maze side 206 have been commonly labelled; although it may be understood that the interior surface 220 of the third maze side 206 may be located underneath the second metal plate 218.

The mechanical lock box 100 further includes a release chamber 222. In particular, the release chamber 222 is defined in the maze 200. The release chamber 222 is located within an upper level of the maze 200. That is, with the maze 200 having a multi-level design, the release chamber 222 is defined in the upper level (i.e., uppermost level) of the maze 200. In an aspect of the present disclosure, as illustrated in FIG. 2, the maze 200 has at least four levels. In the present examples, the at least four levels include a first level 230, a second level 232, a third level 234 and a fourth level 236. Herein, the first level 230 is adjacent to the lower maze side 212. That is, the first level 230 may be located directly above the lower maze side 212. The second level 232 is above the first level 230. The third level 234 is above the second level 232 and below the release chamber 222. The fourth level 236 is in an interior of the release chamber 222. Generally, the fourth level 236 corresponds to the upper level of the maze 200 (i.e., the uppermost level, as described earlier). In the present examples, as illustrated, the upper level (i.e., the fourth level 236) has a slot 238 defined therein. In particular, as shown, the slot 238 is defined in the upper maze side 210 of the maze 200. Furthermore, the maze 200 is not limited to having only four levels. Further degrees of complexity may be added by increasing the number of levels. Additionally, each level may include a tortuous path in two or three dimensions upon which a ball must travel to reach the next level.

Further, the maze 200 includes a plurality of maze pathways. In particular, the plurality of maze pathways is defined in the maze 200. In the present examples, each level, including the first level 230, the second level 232, the third level 234 and the fourth level 236 has at least one of the plurality of maze pathways. In an aspect of the present disclosure, the mechanical lock box 100, or specifically the maze 200, includes seven maze pathways defined therein, namely a first maze pathway 240, a second maze pathway 242, a third maze pathway 244, a fourth maze pathway 246, a fifth maze pathway 248, a sixth maze pathway 250 and a seventh maze pathway 252. It may be appreciated that the maze 200 may include multiple sections which may be connected to each other to define the maze pathways.

Herein, the first maze pathway 240 is in the first level 230. The first maze pathway 240 extends from the fourth maze side 208 to the second maze side 204. The second maze pathway 242 connects the first level 230 to the third level 234. The second maze pathway 242 extends along the second maze side 204. The second maze pathway 242 may extend in a direction from the lower maze side 212 to the upper maze side 210. The third maze pathway 244 is in the second level 232. The third maze pathway 244 extends from the second maze pathway 242 to the fourth maze pathway 246. The third maze pathway 244 may extend in a direction from the second maze side 204 to the fourth maze side 208. The fourth maze pathway 246 extends between the second level 232 and the third level 234. The fourth maze pathway 246 may extend in a direction from the lower maze side 212 to the upper maze side 210. The fifth maze pathway 248 extends from the fourth maze pathway 246 to the sixth maze pathway 250. The fifth maze pathway 248 may extend in a direction from the fourth maze side 208 to the second maze side 204. The sixth maze pathway 250 extends from the fifth maze pathway 248 to the fourth level 236. The sixth maze pathway 250 may extend in a direction from the lower maze side 212 to the upper maze side 210. The seventh maze pathway 252 is in the interior of the release chamber 222. The seventh maze pathway 252 may extend in a direction from the second maze side 204 to the fourth maze side 208. The seventh maze pathway 252 may generally define the release chamber 222. Further, each of the first maze pathway 240, the second maze pathway 242, the third maze pathway 244, the fourth maze pathway 246, the fifth maze pathway 248, the sixth maze pathway 250 and the seventh maze pathway 252 extend between the second maze side and the fourth maze side, as well as between the lower maze side 212 and the upper maze side 210, along a plurality of tortuous paths. Such plurality of tortuous paths defines the maze 200 for the purposes of the present disclosure.

In some examples, the maze 200 also includes a pivot box 260. The pivot box 260 is defined in the maze 200 by protrusion of, for example, one of the sections of the maze 200. In an example, as illustrated, the pivot box 260 is connected to the fourth maze side 208 and the lower maze side 212. Specifically, herein the term "connected" denotes that the pivot box 260 may be disposed in proximity to the fourth maze side 208 and the lower maze side 212, or may generally be located at a corner defined by the fourth maze side 208 and the lower maze side 212. The maze 200 further includes an axle 262 located within the pivot box 260. The axle 262 is parallel to the fourth maze side 208 and the lower maze side 212. For such configuration, it may be contemplated that the pivot box 260 may have a through-hole (not shown) defined therein along a direction between the first maze side 202 and the third maze side 206, and the axle 262 may be supported in the said through-hole. Further, it may be contemplated that the axle 262 may be utilized to support a fastening member (such as a bolt, as described later) and thereby utilized to secure a suitable component (such as, a hook bar as described later) of the locking arrangement 150 therewith, in the maze 200.

The maze 200 further includes a rod hole 270 (as shown in FIG. 2) in a center of the release chamber 222. In the present examples, the rod hole 270 may be in the form of a through-hole defined in the maze 200 and may extend through the second maze side 204 and an adjacent section of the maze defining the release chamber 222. Further, in the present examples of the mechanical lock box 100, the circular cutout 128 (defined in the second wall 114 of the housing 110, as shown in FIG. 1) is in line with the rod hole 270 in the center of the release chamber 222. That is, the circular cutout 128 and the rod hole 270 are aligned with respect to each other. This may be done so as to allow for an elongated component to extend from an outside of the housing 100 into the maze 200.

Further, the mechanical lock box 100, specifically the locking arrangement 150, includes a ball 300. The ball 300 is enclosed in the maze 200. The ball 300 is free to roll along the maze pathways and into the release chamber 222, of the maze 200. That is, the ball 300 may be free to roll inside the maze 200, such that the ball 300 may travel along the first maze pathway 240, the second maze pathway 242, the third maze pathway 244, the fourth maze pathway 246, the fifth maze pathway 248, the sixth maze pathway 250 and the seventh maze pathway 252. It may be appreciated that the ball 300 may roll in the maze 200 by spatial manipulation of the mechanical lock box 100. That is, as and when the mechanical lock box 100 may be moved or re-oriented, the ball 300 may roll accordingly under the effect of gravity. Such arrangement may be contemplated as known to be used in puzzles and games, and thus not described in any further detail herein.

In an aspect of the present disclosure, the ball 300 is made from a metallic material selected from the group including steel, carbon steel, silver, gold, titanium, tungsten, iridium, osmium, chromium, brass and combinations of the same. In another aspect of the present disclosure, the ball 300 is made from a hard polymeric material coated with a metal selected from the group including steel, carbon steel, silver, gold, titanium, tungsten, iridium, osmium, chromium, brass and combinations of the same. Herein, the hard polymeric material is selected from the group including nylon, polyvinyl chloride, polythene, polytetrafluoroethelene. In yet another aspect of the present disclosure, the ball 300 is made from a ceramic material. Such materials may be selected for forming the ball 300, as these materials may make a sound, such as a "clink" sound, when the ball 300 may strike any one of the first metal plate 214 and the second metal plate 218, when the mechanical lock box 100 is spatially manipulated to cause rolling of the ball 300. In an example, the ball 300 may be about 10 mm in diameter.

Figure 4:
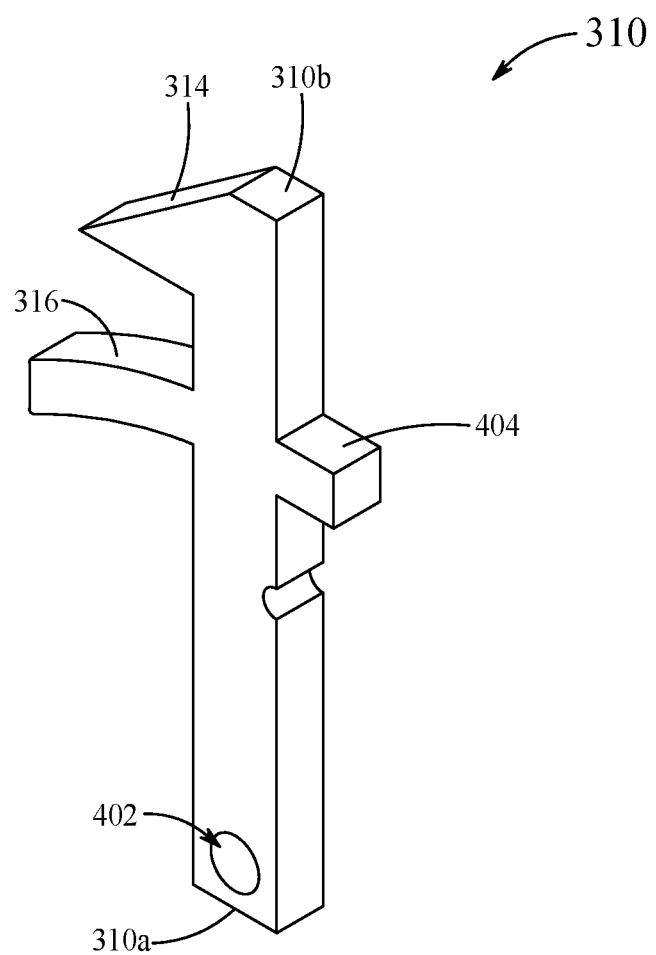
FIG. 4 is a perspective view of a hook bar of the locking arrangement, according to certain embodiments.

The mechanical lock box 100, specifically the locking arrangement 150, further includes a hook bar 310. The hook bar 310 may be in the form of a solid or a hollow elongated member. FIG. 4 illustrates a perspective view of the hook bar 310. Referring to FIGS. 3A, 3B and 4 in combination, as illustrated, the hook bar 310 has a first hook bar end 310*a* and a second hook bar end 310*b*. In particular, as shown, the first hook bar end 310*a* extends through the slot 238 in the upper level. This way the hook bar 310 is received inside the maze 200. The first hook bar end 310*a* further pivotally connects to the pivot box 260 in the maze 200. For this purpose, an axle hole 402 (as shown in FIG. 4) is located on the first hook bar end 310*a*. In the present examples, the axle hole 402 is in the form of a through-hole formed in a body of the hook bar 310 proximal to the first hook bar end 310*a* thereof. The maze 200 further includes a bolt 312. The axle 262 (as described earlier) extends through the axle hole 402 and the bolt 312 secures the first hook bar end 310*a* to the axle 262. For this purpose, the axle 262 and the bolt 312 may be fastened with each other through the axle hole 402, and thus the hook bar 310 is secured between the axle 262 and the bolt 312 at the first hook bar end 310*a* thereof. With such arrangement, the hook bar 310 is disposed pivotally with respect to the pivot box 260 at the first hook bar end 310*a* thereof, in the maze 200.

Further, the second hook bar end 310*b* has a lock hook 314. Herein, the lock hook 314 is in the form of a hook-shaped structure which may be engaged with other similarly shaped structure. In the present examples, the lock hook 314 is configured to engage with the hook fastener 126 (as described with reference to FIG. 1). With the hook fastener 126 attached to the lid 120, the lock hook 314 is implemented to hold the lid 120 in a locked position thereof. That is, when the lid 120 is disposed in the closed configuration thereof, the lock hook 314 may engage with the hook fastener 126 to cause locking (restrictive relative movement) of the lid with respect to the housing sides. Thereafter, for disposing the lid 120 in the open configuration thereof, the lock hook 314 may need to be disengaged from the hook fastener 126. The locking arrangement 150 provides a mechanism for disengagement of the lock hook 314 from the hook fastener 126 by spatially manipulating the present mechanical lock box 100.

The mechanical lock box 100, specifically the hook bar 310, includes a hook pusher 316 connected beneath the hook bar 310. In particular, the hook pusher 316 is located within the release chamber 222. As illustrated, the hook pusher 316 is in the form of a projection from the body of the hook bar 310, extending towards and into the release chamber 222. The hook pusher 316 being part of the body of the hook bar 310 cause the hook bar 310 to move when the hook pusher 316 is imparted with some force. In the present examples, the hook pusher 316 is configured to pivot the hook bar 310 about the first hook bar end 310*a* which is constrained at the pivot box 260. In the present mechanical lock box 100, the hook pusher 316 pivots the hook bar 310 to disengage the lock hook 314 from the hook fastener 126 and thereby unlocks the lid 120 when the ball 300 pushes against the hook pusher 316.

Figure 5:
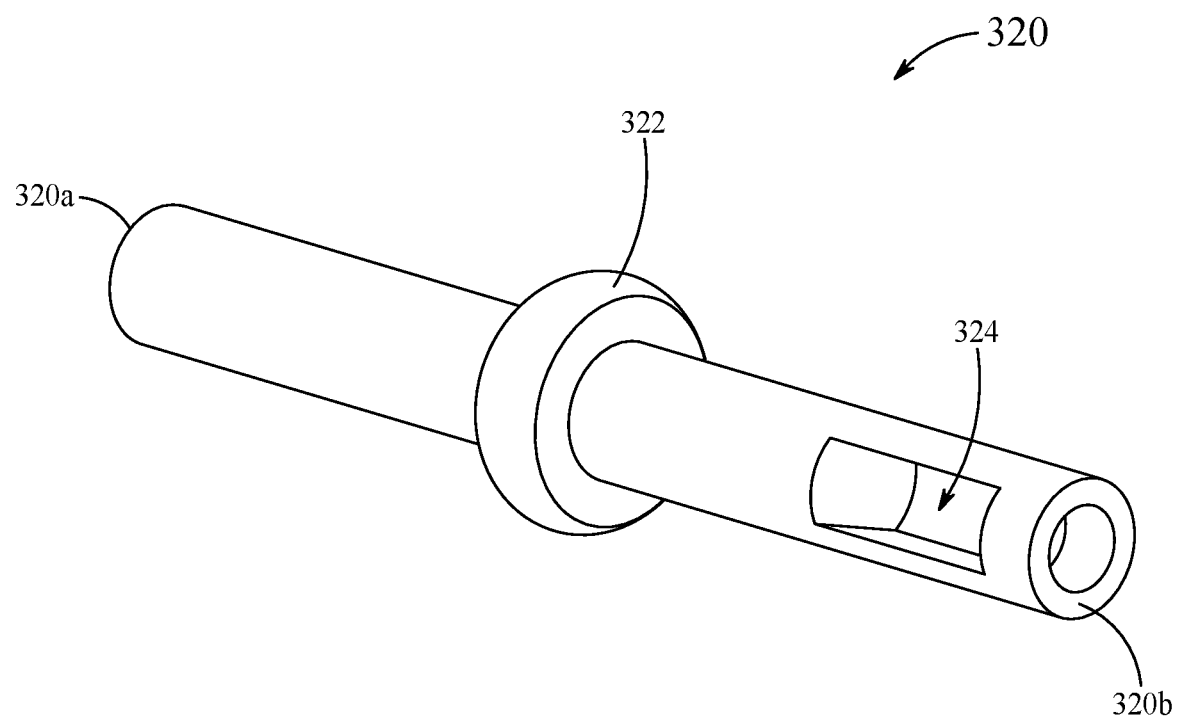
FIG. 5 is a perspective view of a push rod of the locking arrangement, according to certain embodiments.

The mechanical lock box 100, specifically the locking arrangement 150, further includes a push rod 320. FIG. 5 illustrates a perspective view of the push rod 320. Referring to FIGS. 3A, 3B and 5 in combination, as illustrated, the push rod 320 is generally in the form of a cylindrical shaped member. The push rod 320 extends partially through the circular cutout 128 (as may be seen and understood from FIG. 1) and into the rod hole 270 of the release chamber 222 (as may be seen and understood from FIGS. 2, 3A and 3B). Specifically, the push rod 320 extends partially through the circular cutout 128 and through the rod hole 270, into the release chamber 222 of the maze 200. The push rod 320 has a first rod end 320*a* and a second rod end 320*b*. The mechanical lock box 100 also includes a rod stopper 322. The rod stopper 322 is located on the push rod 320. With the push rod 320 extending partially through the circular cutout 128 and through the rod hole 270, the rod stopper 322 is disposed between the second wall 114 and the second maze side 204 (as may be seen and understood from FIG. 1). The rod stopper 322 prevents the push rod 320 from being fully inserted into the release chamber 222, by being restrained by the second maze side 204 when in contact therewith.

Further, as illustrated, the second rod end 320*b* of the push rod 320 includes a spring cavity 324. The spring cavity 324 may be in the form of a hollow space defined proximal to the second rod end 320*b* of the push rod 320. Also, as illustrated, the mechanical lock box 100, specifically the locking arrangement 150, includes a first compression spring 330. The first compression spring 330 is disposed, in general, in the spring cavity 324. The first compression spring 330 has a first spring end 330a and a second spring end 330b. For purposes of the present disclosure, the first compression spring 330 may be a coil spring (also referred to as helical spring) as known in the art. The first spring end 330a is configured to be held within the spring cavity 324 and the second spring end 330b is configured to be held within the maze 200 by a retaining pin 332. In an example, the retaining pin 332 may be about 2 mm in diameter and has the function of keeping the push rod 320 in place and as an end-point fixation for the first compression spring 330.

The mechanical lock box 100, specifically the locking arrangement 150, further includes a second compression spring 340. The second compression spring 340 has a third spring end 340a and a fourth spring end 340b. In the locking arrangement 150, the third spring end 340a is attached to the fourth maze side 208 and the fourth spring end 340b is attached to the hook bar 310. Specifically, the fourth spring end 340b is attached to (supported by) an extension 404 (as shown in FIG. 4) of the hook bar 310. For purposes of the present disclosure, the second compression spring 340 may be a coil spring (also referred to as helical spring) as known in the art. In the mechanical lock box 100, the second compression spring 340 has a compressed state (as shown in FIG. 7B and explained in the proceeding paragraphs in more detail) where the ball 300 pushes against the hook pusher 316 to unlock the lock hook 314 from the hook fastener 126 and a released state (as shown in FIGS. 6A, 6B and 7A and explained in the proceeding paragraphs in more detail) where the second compression spring 340 pushes the hook bar 310 to a position parallel to the fourth wall 118 to lock the lock hook 314 to the hook fastener 126.

Figure 6A:
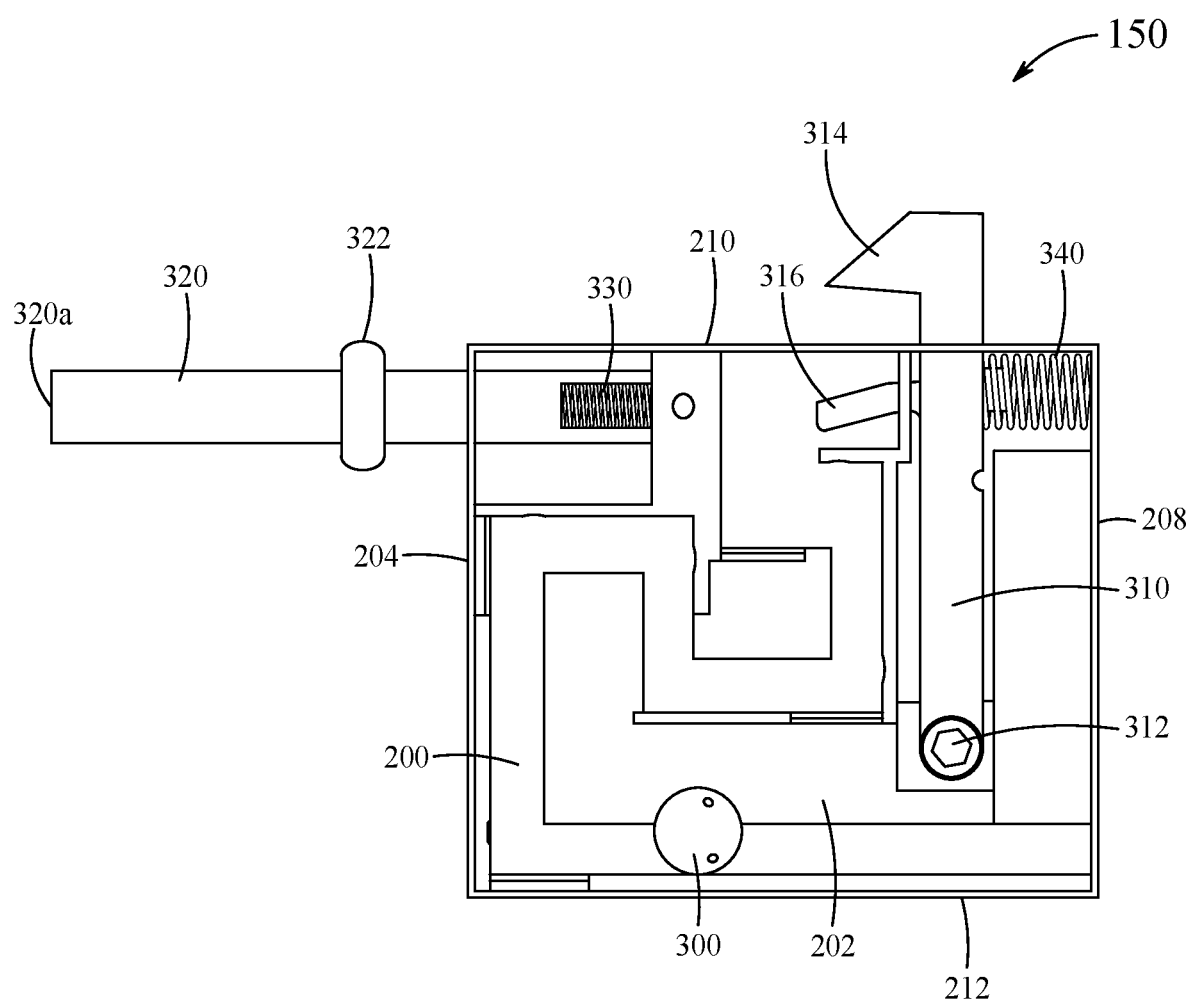
FIG. 6A is a planar view of the locking arrangement including the three-dimensional multi-level printed maze with the first maze side removed therefrom and with a ball positioned outside of a release chamber thereof, according to certain embodiments.
Figure 6B:
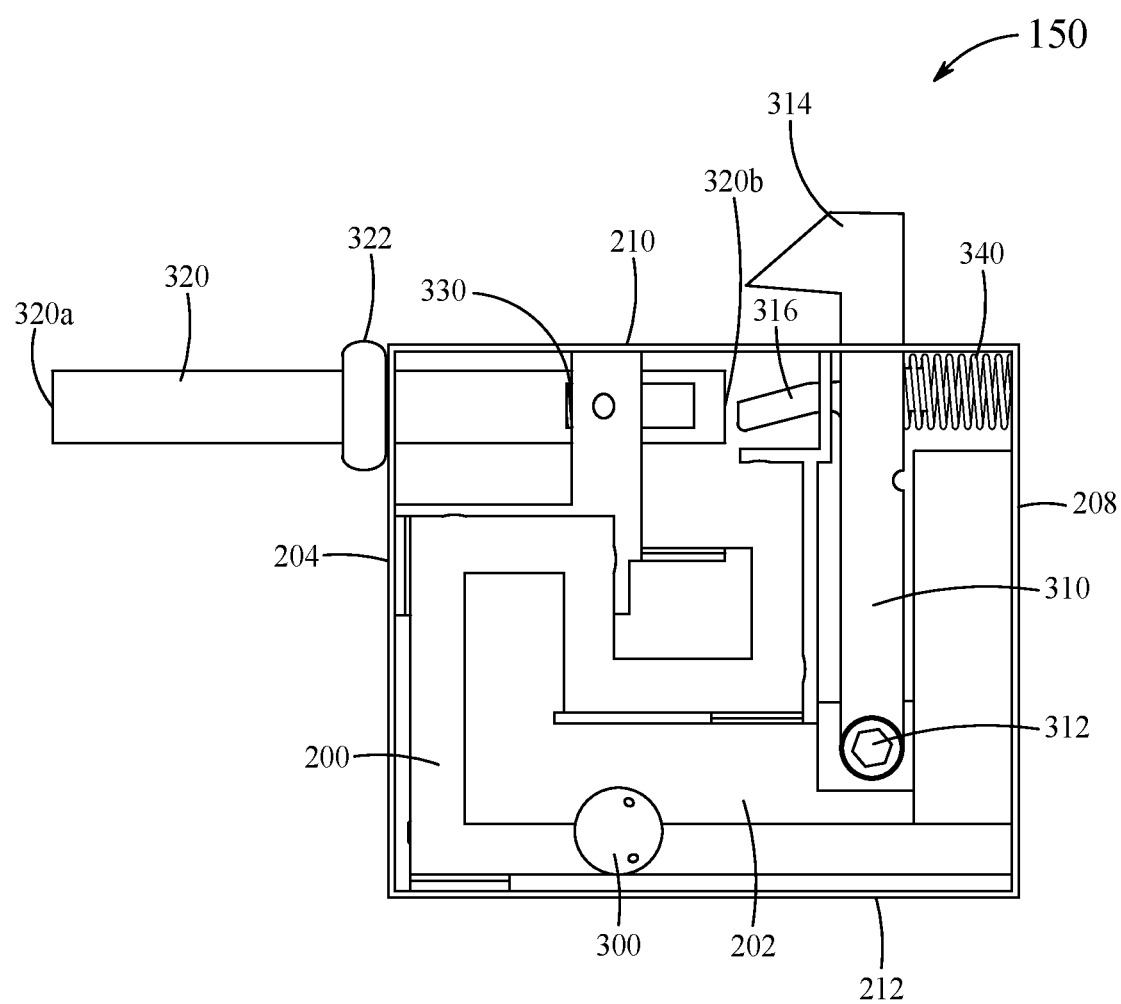
FIG. 6B is a planar view of the locking arrangement including the three-dimensional multi-level printed maze with the first maze side removed therefrom and with the ball positioned outside of the release chamber thereof and the push rod been pressed, according to certain embodiments.

Referring to FIG. 6A, the ball 300 is shown positioned outside of the release chamber 222. Further, the second compression spring 340 is shown to be in the released state disposing the hook bar 310 (by its bias force) to be parallel to the fourth wall 118. In such case, when the lid 120 is in the closed configuration thereof, the lock hook 314 is engaged to the hook fastener 126, and thus the mechanical lock box 100 is locked. In such case, when the push rod 320 is pushed from the first rod end 320a thereof to cause the second rod end 320b thereof to move inside the release chamber 222 against the bias force of the first compression spring 330, as depicted in FIG. 6B, the push rod 320 may still not be able to push against the hook pusher 316 to unlock the lock hook 314 from the hook fastener 126 as further movement of the push rod 320 is restrained by the rod stopper 322.

Figure 7A:
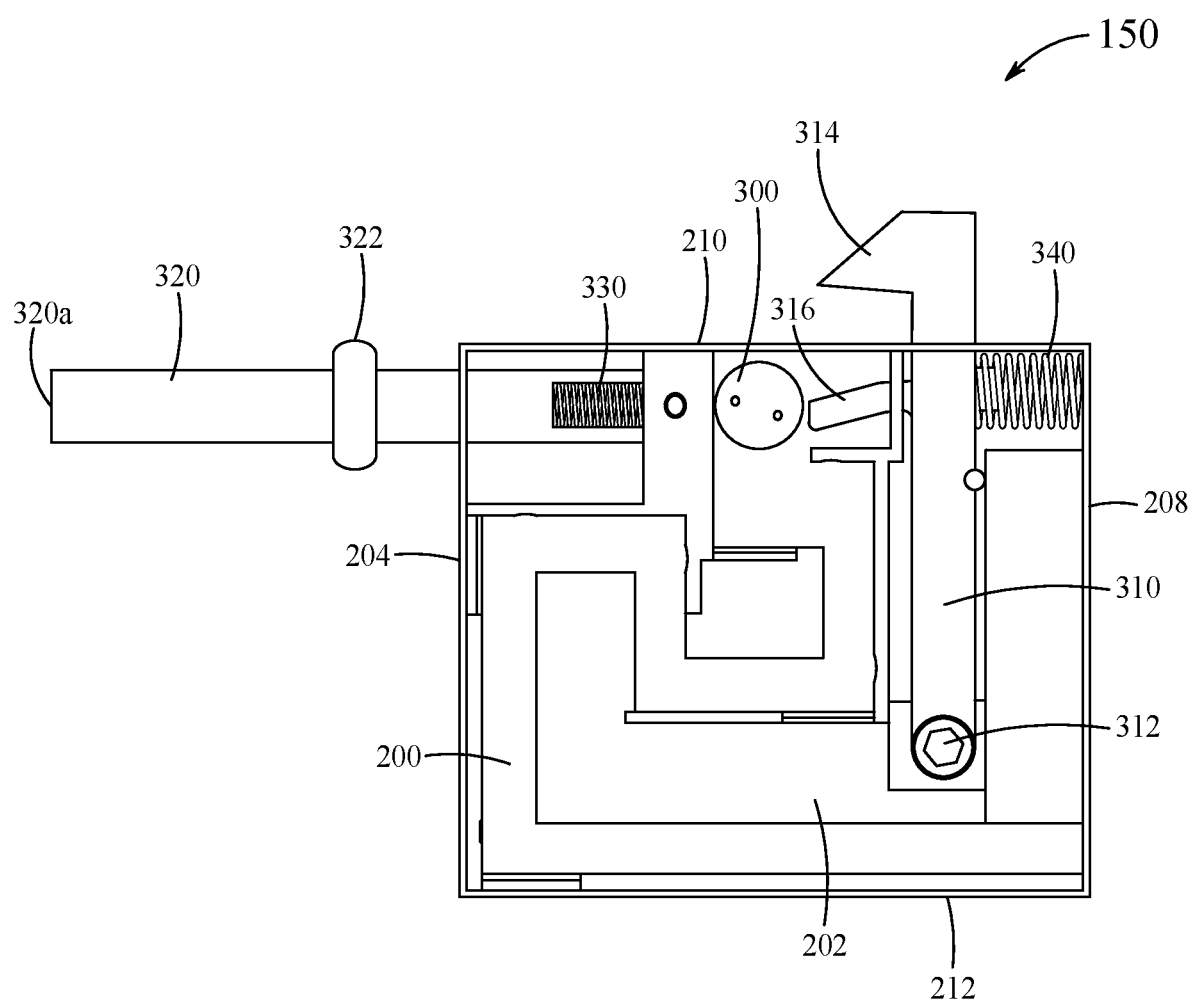
FIG. 7A is a planar view of the locking arrangement including the three-dimensional multi-level printed maze with the first maze side removed therefrom and with the ball positioned within the release chamber thereof, according to certain embodiments.

Referring to FIG. 7A, the ball 300 is shown positioned in the release chamber 222. In the present mechanical lock box 100, the ball 300 is moved from its position outside of the release chamber 222 (as depicted in FIGS. 6A and 6B) to position inside the release chamber 222 (as depicted in FIG. 7A) by spatially manipulating the mechanical lock box 100. The mechanical lock box 100 may be manipulated in three-dimensional space by moving and changing its orientation. It is required to spatially manipulate the mechanical lock box 100 in a manner to cause the ball 300 to follow a path along the maze pathways and into the release chamber 222. That is, the ball 300 is made to roll inside the maze 200, such that the ball 300 may travel along the first maze pathway 240, the second maze pathway 242, the third maze pathway 244, the fourth maze pathway 246, the fifth maze pathway 248, the sixth maze pathway 250 and the seventh maze pathway 252.

Figure 7B:
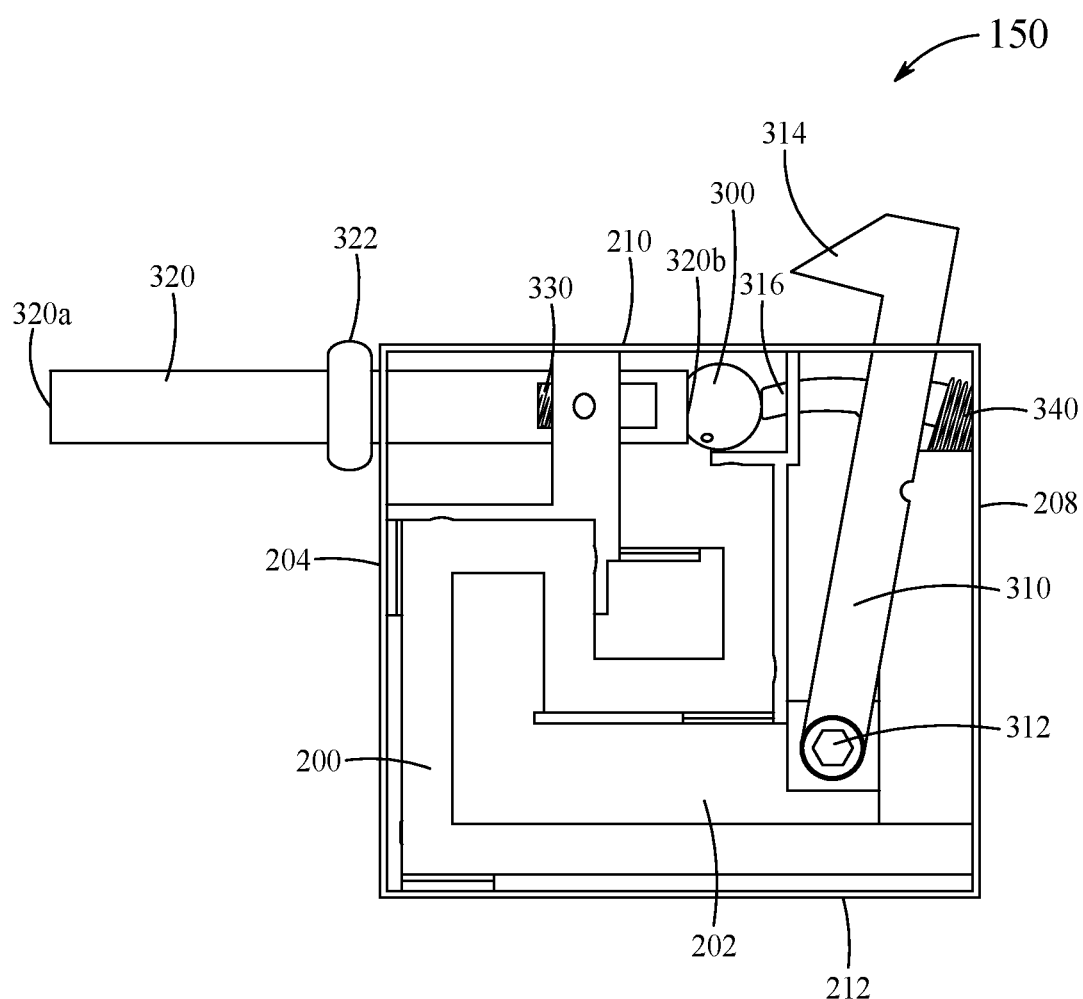
FIG. 7B is a planar view of the locking arrangement including the three-dimensional multi-level printed maze with the first maze side removed therefrom and with the ball positioned within the release chamber thereof and the push rod been pressed, according to certain embodiments.

Further referring to FIG. 7B, with the ball 300 positioned in the release chamber 222, when the push rod 320 is pushed from the first rod end 320a thereof to cause the second rod end 320b thereof to move inside the release chamber 222 against the bias force of the first compression spring 330, the push rod 320 pushes against the ball 300 in the release chamber 222, which in turn pushes the hook pusher 316 against the bias force of the second compression spring 340 to cause the second compression spring 340 to be in the compressed state thereof. In such condition, the lock hook 314 is disengaged from the hook fastener 126 (as discussed earlier) and thereby allow the lid 120 to be rotated about the hinge 122 and be disposed in the open configuration thereof, and unlocking the present mechanical lock box 100.

Further, for relocking the mechanical lock box 100, the first rod end 320a of the push rod 320 may be released. When the force on the push rod 320 is released, the bias force of the first compression spring 330 causes the second rod end 320b of the push rod 320 to move back out from the release chamber 222. This causes the force on the ball 300 to be withdrawn, which in turn cause the bias force of the second compression spring 340 to push and pivot the hook bar 310 back to the position parallel to the fourth wall 118 to engage the lock hook 314 to the hook fastener 126, and locking the present mechanical lock box 100. In some examples, the mechanical lock box 100 is further manipulated in three dimensional space until the ball 300 moves out of the release chamber 222. In particular, the mechanical lock box 100 may generally be manipulated in reverse to the said predefined pattern (at least to some steps thereof) to cause the ball 300 to move out of the release chamber 222, and thereby eliminating the possibility of unlocking the mechanical lock box 100 by just pushing the push rod 320 from the first rod end 320a thereof.

Thereby, the present mechanical lock box 100 can be locked and unlocked mechanically by a user through a series of spatial manipulations thereof. In the present examples, the mechanical lock box 100 must be manipulated by spatially moving and orienting the mechanical lock box 100 in three dimensional space in a generally predefined pattern involving moving the ball 300 along the maze pathways and into the release chamber 222. In some examples, the user may refer to the generated sounds by contact/strike of the ball 300 with any one of the first metal plate 214 and the second metal plate 218 when the mechanical lock box 100 is spatially manipulated to cause rolling of the ball 300 (as explained earlier), to estimate a current position of the ball 300 in the maze 200 and therefrom deduce a next step or series of manipulations to be carried out for causing the ball 300 to reach the release chamber 222. With the maze 200 being concealed inside the housing 110 when the mechanical lock box 100 is locked, the user must have knowledge of the said predefined pattern. Such knowledge may be provided to the user in the form of instructions, such as an instruction manual, an instruction video or the like, specific to the particular pattern of the given maze 200, for example at a time of receiving (purchasing) the mechanical lock box 100. Thus, it may only be the user who has access to such knowledge and thus has the "key" for opening (unlocking) of the given mechanical lock box 100.

It may be appreciated that for the said "key" to be unique, as may be required, the maze 200 must be unique for each (or for at least a plurality of models) mechanical lock box 100 manufactured. In the present examples, the maze 200 is computer-generated with an algorithm ensuring a random design with a solvable puzzle. For this purpose, any suitable maze generator algorithms as known in the art may be implemented, such as, but not limited to, Randomized Kruskal's algorithm, Randomized Prim's algorithm, Wilson's algorithm, Aldous-Broder algorithm and the modified versions thereof. With the maze 200 having a unique design and the maze 200 being hidden inside the housing 110, the user must remember the particular design of the maze 200 for the given mechanical lock box 100 in order to open the mechanical lock box 100, thus personalizing the mechanical lock box 100 of the present disclosure to its specific user.

As the unique maze 200 may be easily printed using the 3D printer and assembled to form the locking arrangement 150, and as the locking arrangement 150 may be easily installed on-site within the housing 110, such as into pre-made decorative boxes chosen by the customer, the present disclosure may thus be able to convert suitable pre-made boxes into mechanical lock boxes. To open the mechanical lock box 100, the user may only need to remember the pattern of the maze 200 and move the ball 300 to the correct position by manipulating the box in the three dimensions. Besides remembering the maze 200, when the ball 300 strikes any one of the first metal plate 214 and the second metal plate 218, the sound generated gives another piece of information to the user related to guiding the ball 300 to the correct position in the release chamber 222 for unlocking the mechanical lock box 100.

Thus, the present mechanical lock box 100 eliminates the need of managing a physical key which is typically associated with traditional lock boxes. Further, the present mechanical lock box 100 helps in training eye, ear, and hand coordination, enhancing problem-solving skills, expanding the brain while improving the reasoning skills, and relieving stress, keeping the brain focused and the hands busy of the user. The present mechanical lock box 100 can be easily manufactured, assembled, and installed within on-site on items such as fancy boxes. The multi-level maze 200 ensures that a sufficiently complex pattern is implemented and thus makes the present mechanical lock box 100 a lot more secure compared to traditional lock boxes.

In some examples, an algorithm which generates the multi-level maze instructions for the 3D printer to print the maze 200 may incorporate personalization features related to a user of the mechanical lock box 100. In a non-limiting example, the algorithm may incorporate a user's name, a password, birth date, or other personalized information into the algorithm. The multi-level maze instructions may direct the 3D printer to build the maze 200 with the personalized instructions defining a length, number of manipulations, number of sounds of the ball 300 hitting the plates, and the like. In a non-limiting example, a birth date of the user may be used to define a series of manipulations required for unlocking the mechanical lock box 100 for a starting position of the ball 300. In a non-limiting example, if the birthday is March 6 (e.g., Mar. 6, 2021), the user may be required to manipulate the ball 300 three times about yaw axis to the right, left and right until two (or three) sounds are heard, and also manipulate the ball 300 six times about pitch axis in a three dimensional alternating sequence (like up-down-up-down-up-down) until five (or six) sounds are heard. It may be appreciated that other details may be used for generating the said instructions without any limitations.

Figure 8:
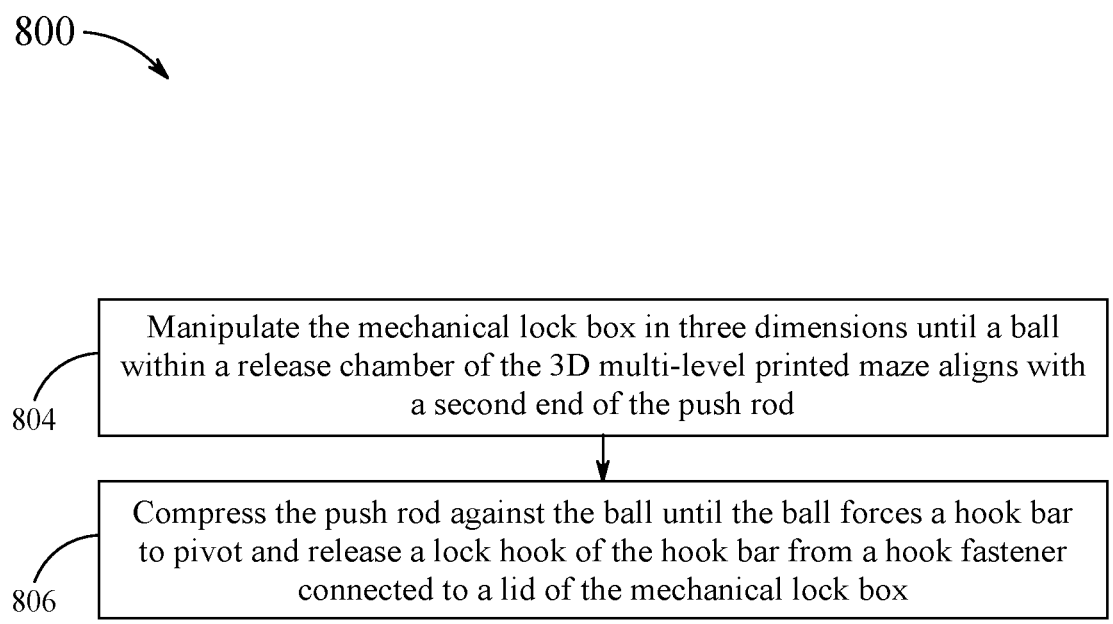
FIG. 8 is an exemplary flowchart of a method of operating the mechanical lock box, according to certain embodiments.

Referring to FIG. 8, an exemplary flowchart of a method 800 of operating the mechanical lock box 100 including the three-dimensional (3D) multi-level printed maze 200 is illustrated. The method 800 is described with reference to the mechanical lock box 100 and its components illustrated in FIG. 1 through FIG. 7B.

At step 804, the method 800 includes manipulating the mechanical lock box 100 in three dimensions until the ball 300 within the release chamber 222 of the 3D multi-level printed maze 200 aligns with the second rod end 320*b* of the push rod 320. For this purpose, the ball 300 is moved from its position outside of the release chamber 222 (as depicted in FIGS. 6A and 6B) to position inside the release chamber 222 (as depicted in FIG. 7A) by spatially manipulating the mechanical lock box 100. The mechanical lock box 100 may be manipulated in three-dimensional space by moving and changing its orientation. It is required to spatially manipulate the mechanical lock box 100 in a manner to cause the ball 300 to follow a path along the maze pathways and into the release chamber 222. That is, the ball 300 is made to roll inside the maze 200, such that the ball 300 may travel along the first maze pathway 240, the second maze pathway 242, the third maze pathway 244, the fourth maze pathway 246, the fifth maze pathway 248, the sixth maze pathway 250 and the seventh maze pathway 252. At this point, the mechanical lock box 100 may be upside down, or held canted to the left, in order to retain the ball in the release chamber.

At step 806, the method 800 includes pressing the first rod end 320*a* of the push rod 320. When the push rod 320 is pushed from the first rod end 320*a* thereof, it causes the second rod end 320*b* of the push rod 320 to move inside the release chamber 222 against the bias force of the first compression spring 330.

Compressing the push rod 320 against the ball 300 until the ball 300 forces the hook bar 310 to pivot and release the lock hook 314 of the hook bar 310 from the hook fastener 126 connected to the lid 120 of the mechanical lock box 100. That is, with the ball 300 positioned in the release chamber 222, when the push rod 320 is pushed from the first rod end 320*a* to cause the second rod end 320*b* thereof to move inside the release chamber 222 against the bias force of the first compression spring 330, the push rod 320 pushes against the ball 300 in the release chamber 222, which in turn pushes the hook pusher 316 against the bias force of the second compression spring 340 to cause the second compression spring 340 to be in the compressed state thereof. In such condition, the lock hook 314 is disengaged from the hook fastener 126 and thereby allow the lid 120 to be rotated about the hinge 122 and be disposed in the open configuration thereof, and unlocking the present mechanical lock box 100.

After opening the box, the box can be positioned in the upright position (normal position), the first rod end 320*a* can be released, and the ball 300 will leave the release chamber 222. Also, at this stage, the box can be locked by simply closing the lid 120. The design of the lock hook 314 and the hook fastener 126 makes it possible to lock the mechanical lock box 100 by merely closing the lid 120.

In further detail, the method 800 further includes relocking the mechanical lock box 100 by releasing the first rod end 320*a* of the push rod 320. That is, when the force on the push rod 320 is released, the bias force of the first compression spring 330 causes the second rod end 320*b* of the push rod 320 to move back out from the release chamber 222. This causes the force on the ball 300 to be withdrawn, which in turn cause the bias force of the second compression spring 340 to push and pivot the hook bar 310 back to the position parallel to the fourth wall 118 to engage the lock hook 314 to the hook fastener 126, and locking the present mechanical lock box 100.

Figure 9:
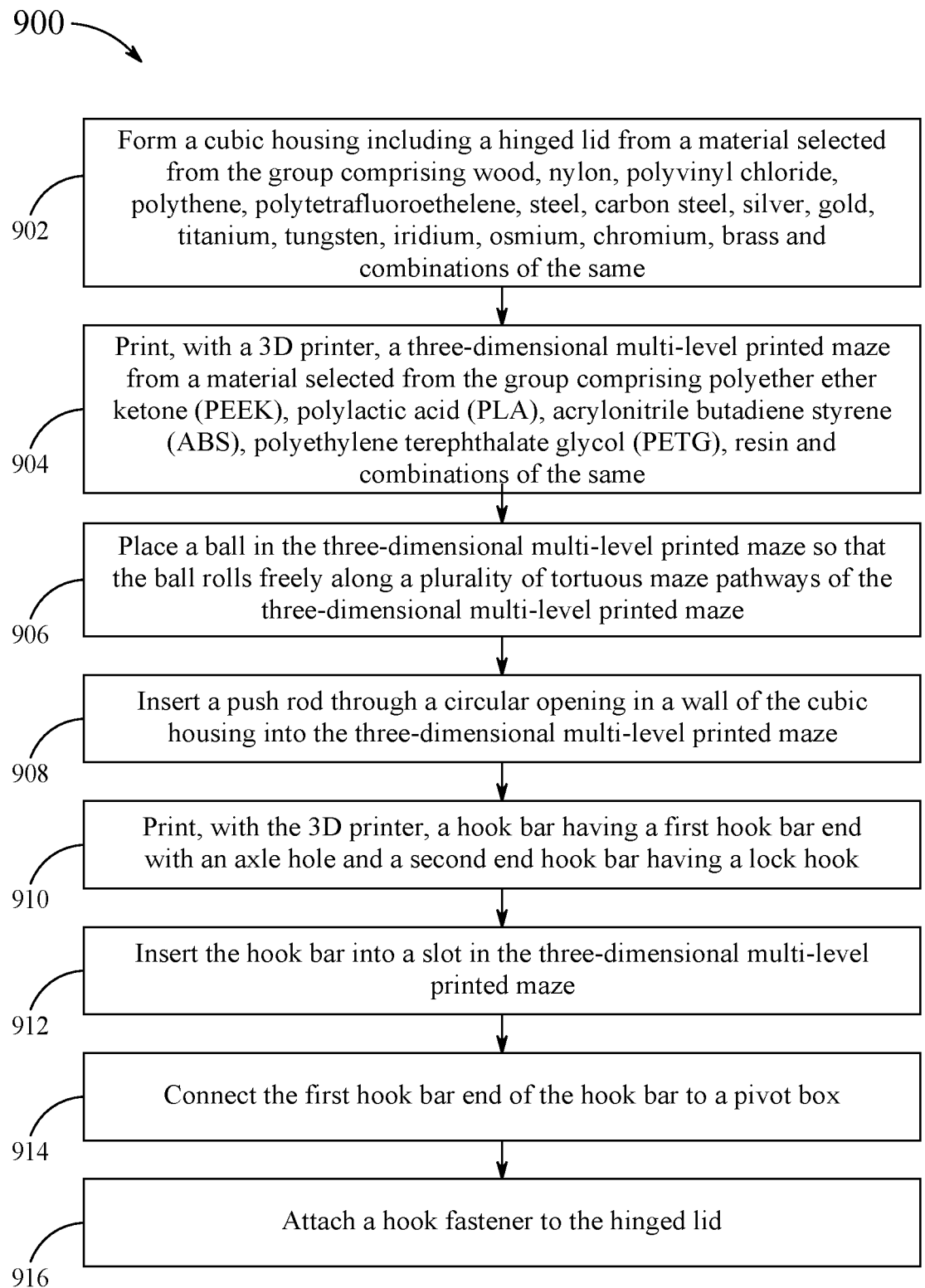
FIG. 9 is an exemplary flowchart of a method of manufacturing the mechanical lock box, according to certain embodiments.

Referring to FIG. 9, an exemplary flowchart of a method 900 of manufacturing the mechanical lock box 100 is illustrated. The method 900 is described with reference to the mechanical lock box 100 and its components illustrated in FIG. 1 through FIG. 7B.

At step 902, the method 900 includes forming the housing 110 including the hinged lid 120 from a material selected from the group comprising wood, nylon, polyvinyl chloride, polythene, polytetrafluoroethelene, steel, carbon steel, silver, gold, titanium, tungsten, iridium, osmium, chromium, brass and combinations of the same. With the present mechanical lock box 100 being designed to be implemented for storing personal items and/or as a gift box, the use of such materials for the housing 110 may add to overall appeal of the present mechanical lock box 100.

At step 904, the method 900 includes printing, with the 3D printer, the three-dimensional multi-level printed maze 200 from the material selected from the group comprising polyether ether ketone (PEEK), polylactic acid (PLA), acrylonitrile butadiene styrene (ABS), polyethylene terephthalate glycol (PETG), resin and combinations of the same. Such group of materials may be selected as these could be easily implemented in the 3D printing process. The three-dimensional printing process, also known as additive manufacturing process, may be contemplated by a person skilled in the art and is beyond the scope of the present disclosure and thus not described herein.

At step 906, the method 900 includes placing the ball 300 in the three-dimensional multi-level printed maze 200 so that the ball 300 rolls freely along the plurality of tortuous maze pathways of the three-dimensional multi-level printed maze 200. That is, the ball 300 is enclosed in the 3D multi-level printed maze 200. The ball 300 is free to roll along the maze pathways and into the release chamber 222, of the maze 200. That is, the ball 300 may be free to roll inside the maze 200, such that the ball 300 may travel along the first maze pathway 240, the second maze pathway 242, the third maze pathway 244, the fourth maze pathway 246, the fifth maze pathway 248, the sixth maze pathway 250 and the seventh maze pathway 252. It may be appreciated that the ball 300 may roll in the maze 200 by spatial manipulation of the mechanical lock box 100. That is, as and when the mechanical lock box 100 may be moved or re-oriented, the ball 300 may roll accordingly under the effect of gravity.

At step 908, the method 900 includes inserting the push rod 320 through the circular cutout 128 in the wall (i.e., the second wall 114) of the housing 110 into the three-dimensional multi-level printed maze 200. The push rod 320 is generally in the form of a cylindrical shaped member. The push rod 320 extends partially through the circular cutout 128 (as may be seen and understood from FIG. 1) and into the rod hole 270 of the release chamber 222 (as may be seen and understood from FIGS. 2, 3A and 3B). Specifically, the push rod 320 extends partially through the circular cutout 128 and through the rod hole 270, into the release chamber 222 of the maze 200. With the push rod 320 extending partially through the circular cutout 128 and through the rod hole 270, the rod stopper 322 is disposed between the second wall 114 and the second maze side 204 (as may be seen and understood from FIG. 1). The rod stopper 322 prevents the push rod 320 from being fully inserted into the release chamber 222, by being restrained by the second maze side 204 when in contact therewith.

At step 910, the method 900 includes printing, with the 3D printer, the hook bar 310 having the first hook bar end 310a with the axle hole 402 and the second hook bar end 310b having the lock hook 314. The hook bar 310 may be in the form of a solid or a hollow elongated member. Further, the lock hook 314 is in the form of a hook-shaped structure which may be engaged with other similarly shaped structure. The axle hole 402 is located on the first hook bar end 310a. In the present examples, the axle hole 402 is in the form of a through-hole formed in a body of the hook bar 310 proximal to the first hook bar end 310a thereof.

At step 912, the method 900 includes inserting the hook bar 310 into the slot 238 in the three-dimensional multi-level printed maze 200. In particular, the first hook bar end 310a extends through the slot 238 in the upper level. This way the hook bar 310 is received inside the maze 200.

At step 914, the method 900 includes connecting the first hook bar end 310a of the hook bar 310 to the pivot box 260. That is, the first hook bar end 310a pivotally connects to the pivot box 260 in the 3D multi-level printed maze 200. Herein, the axle 262 extends through the axle hole 402 and the bolt 312 secures the first hook bar end 310a to the axle 262. For this purpose, the axle 262 and the bolt 312 may be fastened with each other through the axle hole 402, and thus the hook bar 310 is secured between the axle 262 and the bolt 312 at the first hook bar end 310a thereof. With such arrangement, the hook bar 310 is disposed pivotally with respect to the pivot box 260 at the first hook bar end 310a thereof, in the maze 200.

At step 916, the method 900 includes attaching the hook fastener 126 to the hinged lid 120. The hook fastener 126 may be attached to a bottom face of the lid 120. Herein, the hook fastener 126 may generally have a hook or a Z-shaped cross-section extending downwardly from the bottom face of the lid 120. In the present examples, the hook fastener 126 may be attached to the lid 120 using fasteners 127, such as screws and the like.

In some examples, the method 900 further includes attaching the first metal plate 214 to the first maze side 202 of the three-dimensional multi-level printed maze 200. Particularly, the first metal plate 214 is attached to the interior surface 216 of the first maze side 202, with the interior surface 216 of the first maze side 202 may be located underneath the first metal plate 214. The method 900 further includes attaching the second metal plate 218 to the third maze side 206 of the three-dimensional multi-level printed maze 200. Herein, the first maze side 202 is opposite to the third maze side 206. Particularly, the second metal plate 218 is attached to the interior surface 220 of the third maze side 206, with the interior surface 220 of the third maze side 206 may be located underneath the second metal plate 218.

The first embodiment of the present disclosure is illustrated with respect to FIG. 1 through FIG. 7B. The first embodiment describes the mechanical lock box 100. The mechanical lock box 100 comprises a housing 110 including the lid 120; the hook fastener 126 attached to the lid 120; a three-dimensional (3D) multi-level printed maze 200 located within the housing 110, the three-dimensional (3D) multi-level printed maze 200 including a plurality of maze pathways; a release chamber 222 located within the upper level of the 3D multi-level printed maze 200; the ball 300 enclosed in the 3D multi-level printed maze 200, wherein the ball 300 is free to roll along the maze pathways and into the release chamber 222; a hook bar 310 having the first hook bar end 310a which extends through the slot 238 in the upper level and pivotally connects to the pivot box 260 in the 3D multi-level printed maze 200 and the second hook bar end 310b having the lock hook 314 configured to engage with the hook fastener 126 to hold the lid 120 in the locked position; and the hook pusher 316 connected beneath the hook bar 310 and located within the release chamber 222, wherein the hook pusher 316 is configured to pivot the hook bar 310 to unlock the lid 120 when the ball 300 pushes against the hook pusher 316.

The housing 110 includes the first wall 112, the second wall 114, the third wall 116 and the fourth wall 118, wherein the first wall 112 and the third wall 116 are perpendicular to the second wall 114 and the fourth wall 118, wherein the first wall 112, the second wall 114, the third wall 116 and the fourth wall 118 are connected so as to form housing sides; the floor 124 perpendicular to the housing sides and opposite to the lid 120 of the housing 110; and the hinge 122 connected to the edge 121 of the lid 120 and to the upper end 117 of the third wall 116.

The 3D multi-level printed maze 200 further includes the first maze side 202, the second maze side 204, the third maze side 206 and the fourth maze side 208, and the upper maze side 210 and the lower maze side 212; the first metal plate 214 attached to the interior surface 216 of the first maze side 202; and the second metal plate 218 attached to the interior surface 220 of the third maze side 206, wherein the first maze side 202 is located within the housing 110 such that the first maze side 202 is adjacent to the first wall 112.

The 3D multi-level printed maze 200 further includes the pivot box 260 connected to the fourth maze side 208 and the lower maze side 212; the axle 262 located within the pivot box 260, the axle 262 parallel to the fourth maze side 208 and the lower maze side 212; the axle hole 402 located on the first hook bar end 310a; and the bolt 312, wherein the axle 262 extends through the axle hole 402 and the bolt 312 secures the first hook bar end 310a to the axle 262.

The mechanical lock box 100 further comprising the circular cutout 128 on the second wall 114, the circular cutout 128 in line with the rod hole 270 in the center of the release chamber 222. The mechanical lock box 100, further comprising the push rod 320 having the first rod end 320a and the second rod end 320b, wherein the push rod 320 extends partially through the circular cutout 128 and into the rod hole 270 of the release chamber 222, wherein the second rod end 320b includes the spring cavity 324; the rod stopper 322 located on the push rod 320 between the second wall 114 and the second maze side 204, wherein the rod stopper 322 prevents the push rod 320 from being fully inserted into the release chamber 222; and the first compression spring 330 having the first spring end 330a and the second spring end 330b, the first spring end 330a configured to be held within the spring cavity 324 and the second spring end 330b configured to be held within the 3D multi-level printed maze 200 by the retaining pin 332.

The 3D multi-level printed maze 200 further includes the second compression spring 340 having the third spring end 340a and the fourth spring end 340b, wherein the third spring end 340a is attached to the fourth maze side 208 and the fourth spring end 340b is attached to the hook bar 310; and the second compression spring 340 having the compressed state where the ball 300 pushes against the hook pusher 316 to unlock the lock hook 314 from the hook fastener 126 and the released state where the second compression spring 340 pushes the hook bar 310 to the position parallel to the fourth wall 118 to lock the lock hook 314 to the hook fastener 126.

The 3D multi-level printed maze 200 further has at least four levels, each level having the maze pathway, the at least four levels including the first level 230 adjacent to the lower maze side 212; the second level 232 above the first level 230; the third level 234 above the second level 232 and below the release chamber 222; and the fourth level 236 in the interior of the release chamber 222. The mechanical lock box 100, further comprising the first maze pathway 240 in the first level 230, the first maze pathway 240 extending from the fourth maze side 208 to the second maze side 204; the second maze pathway 242 which connects the first level 230 to the third level 234, the second maze pathway 242 extending along the second maze side 204; the third maze pathway 244 in the second level 232, the third maze pathway 244 extending from the second maze pathway 242 to the fourth maze pathway 246 extending between the second level 232 and the third level 234; the fifth maze pathway 248 extending from the fourth maze pathway 246 to the sixth maze pathway 250, the sixth maze pathway 250 extending from the fifth maze pathway 248 to the fourth level 236; and the seventh maze pathway 252 in the interior of the release chamber 222. Each of the first maze pathway 240, the second maze pathway 242, the third maze pathway 244, the fourth maze pathway 246, the fifth maze pathway 248, the sixth maze pathway 250 and the seventh maze pathway 252 extend between the second maze side 204 and the fourth maze side 208 along the plurality of tortuous paths.

The ball 300 is made from the metallic material selected from the group comprising steel, carbon steel, silver, gold, titanium, tungsten, iridium, osmium, chromium, brass and combinations of the same. The ball 300 is made from the hard polymeric material coated with the metal selected from the group comprising steel, carbon steel, silver, gold, titanium, tungsten, iridium, osmium, chromium, brass and combinations of the same. The hard polymeric material is selected from the group comprising nylon, polyvinyl chloride, polythene, polytetrafluoroethelene. The ball 300 is made from the ceramic material.

The housing 110 is made from the material selected from the group comprising wood, nylon, polyvinyl chloride, polythene, polytetrafluoroethelene, steel, carbon steel, silver, gold, titanium, tungsten, iridium, osmium, chromium, brass and combinations of the same. The 3D multi-level printed maze 200 is printed from the material selected from the group comprising polyether ether ketone (PEEK), polylactic acid (PLA), acrylonitrile butadiene styrene (ABS), polyethylene terephthalate glycol (PETG), resin and combinations of the same.

The second embodiment of the present disclosure is illustrated with respect to FIG. 1 through FIG. 8. The second embodiment describes the method 800 of operating the mechanical lock box 100 including the three-dimensional (3D) multi-level printed maze 200. The method 800 comprises manipulating the mechanical lock box 100 in three dimensions until the ball 300 within the release chamber 222 of the 3D multi-level printed maze 200 aligns with the second rod end 320b of the push rod 320; and compressing the push rod 320 against the ball 300 until the ball 300 forces the hook bar 310 to pivot and release the lock hook 314 of the hook bar 310 from the hook fastener 126 connected to the lid 120 of the mechanical lock box 100.

The method 800, further comprises relocking the mechanical lock box 100 by releasing the first rod end 320a of the push rod 320, and closing the lid.

The third embodiment of the present disclosure is illustrated with respect to FIG. 1 through FIG. 7A and FIG. 9. The third embodiment describes the method 900 of manufacturing the mechanical lock box 100. The method 900 comprising forming the housing 110 including the hinged lid 120 from the material selected from the group comprising wood, nylon, polyvinyl chloride, polythene, polytetrafluoroethelene, steel, carbon steel, silver, gold, titanium, tungsten, iridium, osmium, chromium, brass and combinations of the same; printing, with the 3D printer, the three-dimensional multi-level printed maze 200 from the material selected from the group comprising polyether ether ketone (PEEK), polylactic acid (PLA), acrylonitrile butadiene styrene (ABS), polyethylene terephthalate glycol (PETG), resin and combinations of the same; placing the ball 300 in the three-dimensional multi-level printed maze 200 so that the ball 300 rolls freely along the plurality of tortuous maze pathways of the three-dimensional multi-level printed maze 200; inserting the push rod 320 through the circular cutout 128 in the wall of the housing 110 into the three-dimensional multi-level printed maze 200; printing, with the 3D printer, the hook bar 310 having the first hook bar end 310*a* with the axle hole 402 and the second hook bar end 310*b* having the lock hook 314; inserting the hook bar 310 into the slot 238 in the three-dimensional multi-level printed maze 200; connecting the first hook bar end 310*a* of the hook bar 310 to the pivot box 260; and attaching the hook fastener 126 to the hinged lid 120.

The method 900 of manufacturing, further comprising attaching the first metal plate 214 to the first maze side 202 of the three-dimensional multi-level printed maze 200; and attaching the second metal plate 218 to the third maze side 206 of the three-dimensional multi-level printed maze 200, wherein the first maze side 202 is opposite to the third maze side 206.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A mechanical lock box, comprising:
a housing including a lid;
a hook fastener attached to the lid;
a three-dimensional (3D) multi-level printed maze located within the housing, the three-dimensional (3D) multi-level printed maze including a plurality of maze pathways;
a release chamber located within an upper level of the 3D multi-level printed maze;
a ball enclosed in the 3D multi-level printed maze, wherein the ball is free to roll along the maze pathways and into the release chamber;
a hook bar having a first hook bar end which extends through a slot in the upper level and pivotally connects to a pivot box in the 3D multi-level printed maze and a second hook bar end having a lock hook configured to engage with the hook fastener to hold the lid in a locked position; and
a hook pusher connected beneath the hook bar and located within the release chamber, wherein the hook pusher is configured to pivot the hook bar to unlock the lid when the ball pushes against the hook pusher.

2. The mechanical lock box of claim 1, wherein the housing includes:
a first wall, a second wall, a third wall and a fourth wall, wherein the first wall and the third wall are perpendicular to the second wall and the fourth wall, wherein the first wall, the second wall, the third wall and the fourth wall are connected so as to form housing sides;
a floor perpendicular to the housing sides and opposite to the lid of the housing; and
a hinge connected to an edge of the lid and to an upper end of the third wall.

3. The mechanical lock box of claim 2, wherein the 3D multi-level printed maze further includes:
a first maze side, a second maze side, a third maze side and a fourth maze side, and an upper maze side and a lower maze side;
a first metal plate attached to an interior surface of the first maze side; and
a second metal plate attached to an interior surface of the third maze side, wherein the first maze side is located within the housing such that the first maze side is adjacent to the first wall.

4. The mechanical lock box of claim 3, wherein the 3D multi-level printed maze further includes:
the pivot box connected to the fourth maze side and the lower maze side;
an axle located within the pivot box, the axle parallel to the fourth maze side and the lower maze side;
an axle hole located on the first hook bar end; and
a bolt, wherein the axle extends through the axle hole and the bolt secures the first hook bar end to the axle.

5. The mechanical lock box of claim 4, further comprising:
a circular cutout on the second wall, the circular cutout in line with a rod hole in a center of the release chamber.

6. The mechanical lock box of claim 5, further comprising:
a push rod having a first rod end and a second rod end, wherein the push rod extends partially through the circular cutout and into the rod hole of the release chamber, wherein the second rod end includes a spring cavity;
a rod stopper located on the push rod between the second wall and the second maze side, wherein the rod stopper prevents the push rod from being fully inserted into the release chamber; and
a first compression spring having a first spring end and a second spring end, the first spring end configured to be held within the spring cavity and the second spring end configured to be held within the 3D multi-level printed maze by a retaining pin.

7. The mechanical lock box of claim 6, wherein the 3D multi-level printed maze further includes:
a second compression spring having a third spring end and a fourth spring end, wherein the third spring end is attached to the fourth maze side and the fourth spring end is attached to the hook bar; and
the second compression spring having a compressed state where the ball pushes against the hook pusher to unlock the lock hook from the hook fastener and a released state where the second compression spring pushes the hook bar to a position parallel to the fourth wall to lock the lock hook to the hook fastener.

8. The mechanical lock box of claim 7, wherein the 3D multi-level printed maze further has at least four levels, each level having a maze pathway, the at least four levels including:
a first level adjacent to the lower maze side;
a second level above the first level;
a third level above the second level and below the release chamber; and
a fourth level in an interior of the release chamber.

9. The mechanical lock box of claim 8, further comprising:
a first maze pathway in the first level, the first maze pathway extending from the fourth maze side to the second maze side;
a second maze pathway which connects the first level to the third level, the second maze pathway extending along the second maze side;
a third maze pathway in the second level, the third maze pathway extending from the second maze pathway to a fourth maze pathway extending between the second level and the third level;

a fifth maze pathway extending from the fourth maze pathway to a sixth maze pathway, the sixth maze pathway extending from the fifth maze pathway to the fourth level; and a seventh maze pathway in the interior of the release chamber.

10. The mechanical lock box of claim 9, wherein each of the first maze pathway, the second maze pathway, the third maze pathway, the fourth maze pathway, the fifth maze pathway, the sixth maze pathway and the seventh maze pathway extend between the second maze side and the fourth maze side along a plurality of tortuous paths.

11. The mechanical lock box of claim 1, wherein the ball is made from a metallic material selected from the group comprising steel, carbon steel, silver, gold, titanium, tungsten, iridium, osmium, chromium, brass and combinations of the same.

12. The mechanical lock box of claim 1, wherein the ball is made from a hard polymeric material coated with a metal selected from the group comprising steel, carbon steel, silver, gold, titanium, tungsten, iridium, osmium, chromium, brass and combinations of the same.

13. The mechanical lock box of claim 12, wherein the hard polymeric material is selected from the group comprising nylon, polyvinyl chloride, polythene, polytetrafluoroethelene.

14. The mechanical lock box of claim 1, wherein the ball is made from a ceramic material.

15. The mechanical lock box of claim 1, wherein the housing is made from a material selected from the group comprising wood, nylon, polyvinyl chloride, polythene, polytetrafluoroethelene, steel, carbon steel, silver, gold, titanium, tungsten, iridium, osmium, chromium, brass and combinations of the same.

16. The mechanical lock box of claim 1, wherein the 3D multi-level printed maze is printed from a material selected from the group comprising polyether ether ketone (PEEK), polylactic acid (PLA), acrylonitrile butadiene styrene (ABS), polyethylene terephthalate glycol (PETG), resin and combinations of the same.

17. A method of operating a mechanical lock box including a three-dimensional (3D) multi-level printed maze, comprising:

manipulating the mechanical lock box in three dimensions until a ball within a release chamber of the 3D multi-level printed maze aligns with a second rod end of the push rod; and compressing the push rod against the ball until the ball forces a hook bar to pivot and release a lock hook of the hook bar from a hook fastener connected to a lid of the mechanical lock box.

18. The method of claim 17, further comprising:

relocking the mechanical lock box by releasing the first rod end of the push rod; and closing the lid.

* * * * *